No. 776,460.
Patented November 29, 1904.

UNITED STATES PATENT OFFICE.

LOUIS ANTOINE GARCHEY, OF PARIS, FRANCE.

MANUFACTURE OF ARTIFICIAL GRANITE.

SPECIFICATION forming part of Letters Patent No. 776,460, dated November 29, 1904.

Application filed December 8, 1902. Serial No. 134,434. (No specimens.)

*To all whom it may concern:*

Be it known that I, LOUIS ANTOINE GARCHEY, a citizen of the French Republic, residing at Paris, France, have invented certain new and useful Improvements in and Relating to the Manufacture of Artificial Granite, of which the following is a specification.

This invention has reference to the manufacture of artificial granite, and is designed to enable products to be obtained which approximate to natural granite in their composition and qualities.

When for any reason whatever a glass-furnace with a well or basin is stopped and allowed to cool slowly, the body of glass contained in such furnace is completely devitrified and transformed into a compact monolith, which takes the form of the basin which contained it and possesses the properties of natural granite. My invention consists in utilizing this quality in the glass of acquiring the hardness of granite when devitrified by slow cooling in order to manufacture blocks of all dimensions, as may be desired, capable of replacing granite in any of the ways in which it is used.

The process is as follows: I employ a furnace with a basin or well and a suitable tapping-hole formed in one of the sides. I take an ordinary mold or an ingot-mold made of metal or of some refractory substance the cavity in which has the form of the object to be produced. I previously heat this mold in a suitable fire, which may be either portable or fixed, and I line it inside either by spraying over or applying thereto an insulating or protective substance of any kind which does not adhere to the glass when in a state of fusion. All that is necessary, for example, is by means of a spraying device of any suitable kind to spray a solution of carbonate of magnesium into the interior of the heated ingot-mold. The water is vaporized and a thin film of carbonate of magnesia formed on the sides, which prevents the glass from adhering to the mold. The mold thus prepared is put under the tapping-hole of the melting-furnace and quickly filled with liquid glass. I then arrange this ingot-mold in such a manner that the cooling thereof, as well as that of the cast-glass, takes place very slowly, thus causing the devitrification of the block under the desired conditions. After completely cooling, the block is removed from the mold and is ready to be delivered for use. If it be desired to imitate the coloring of marble and to give the devitrified-glass products the mottled appearance of natural granite, all that is necessary is to introduce into the composition of the glass metallic oxids suitable for coloring it as desired and to drop into the mold a little mica, powdered, at the moment of casting and at the same moment as the introduction of the melted glass, which mica secures in the product a mottled appearance similar to natural granite.

By the means just described it is possible to manufacture blocks suitable for use in large public works, harbors, dams, buttresses, basements in building, and for curbing, &c. Sand and lime stone, which are the two principal elements in the composition of the glass, are always found in proximity to large harbor-works. The contractors thus have the opportunity of manufacturing on the spot without any cost for carriage from artificial synthetic granite blocks, which it is difficult to obtain in the natural state.

The furnace where the ingot-molds are heated and then gradually allowed to cool in order to anneal the ingots should conveniently be a muffle-furnace, so as to prevent the molds from coming into contact with the fire. If small articles are to be molded, the melted glass may be gathered into a ladle before being poured into the ingot-molds, and the mass is drawn out of the molds while in a pasty state, and the blocks are carried to a hydraulic press.

Having now particularly described and ascertained the nature of my invention and in what manner it may be carried into effect, I declare what I claim is—

A process of manufacturing artificial granite which consists in applying a refractory material to the inner surface of a suitable mold, heating the latter, mixing a colored oxid with the glass, then melting the glass and introducing the same when melted into the heated mold, introducing into said mold powdered mica while the melted glass is being introduced thereinto, and finally in devitrifying the glass by slowly allowing the mold to cool.

In testimony whereof I have hereunto set my hand in presence of two subscribing witnesses.

LOUIS ANTOINE GARCHEY.

Witnesses:
    AUGUSTUS E. INGRAM,
    ALFRED FREY.